Aug. 6, 1946.   J. O. SAVAGE   2,405,453
FRUIT PICKER'S APPARATUS
Filed June 26, 1945   2 Sheets-Sheet 1

J. O. Savage
INVENTOR.

BY
ATTORNEYS.

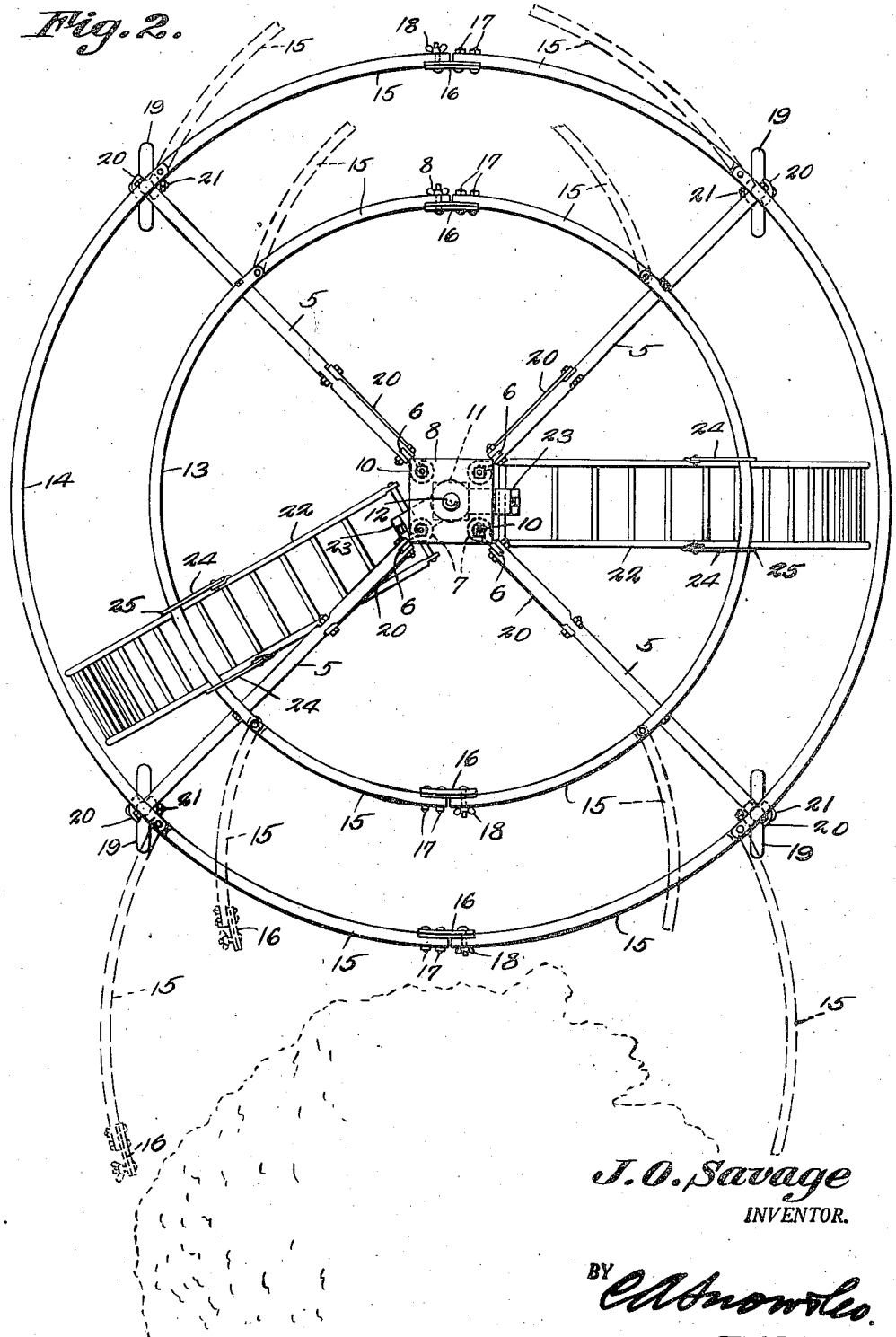

Patented Aug. 6, 1946

2,405,453

UNITED STATES PATENT OFFICE 2,405,453

FRUIT PICKER'S APPARATUS

John O. Savage, Trenton, N. J.

Application June 26, 1945, Serial No. 601,619

3 Claims. (Cl. 304—9)

This invention relates to an apparatus designed for use by fruit pickers, the primary object of the invention being to provide a wheel-supported frame adapted to be moved to a position to surround a tree, so that fruit pickers standing on the ladders of the apparatus, will have ready access to the fruit to be picked.

An important object of the invention is to provide a device of this character including a frame and ladders adjustably connected with the frame, so that the ladders may be moved to various positions with respect to the limbs of the tree, for the convenience of the fruit pickers.

Still another object of the invention is to provide a fruit picker's apparatus which may be moved along a row of trees from which the fruit is to be picked, thereby eliminating the necessity of dismantling the frame in order to position it around a tree from which fruit is to be picked.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 2 is a plan view thereof, illustrating the front and rear pivoted sections of the frame, as swung outwardly to permit the positioning of the apparatus around a tree.

Figure 1:
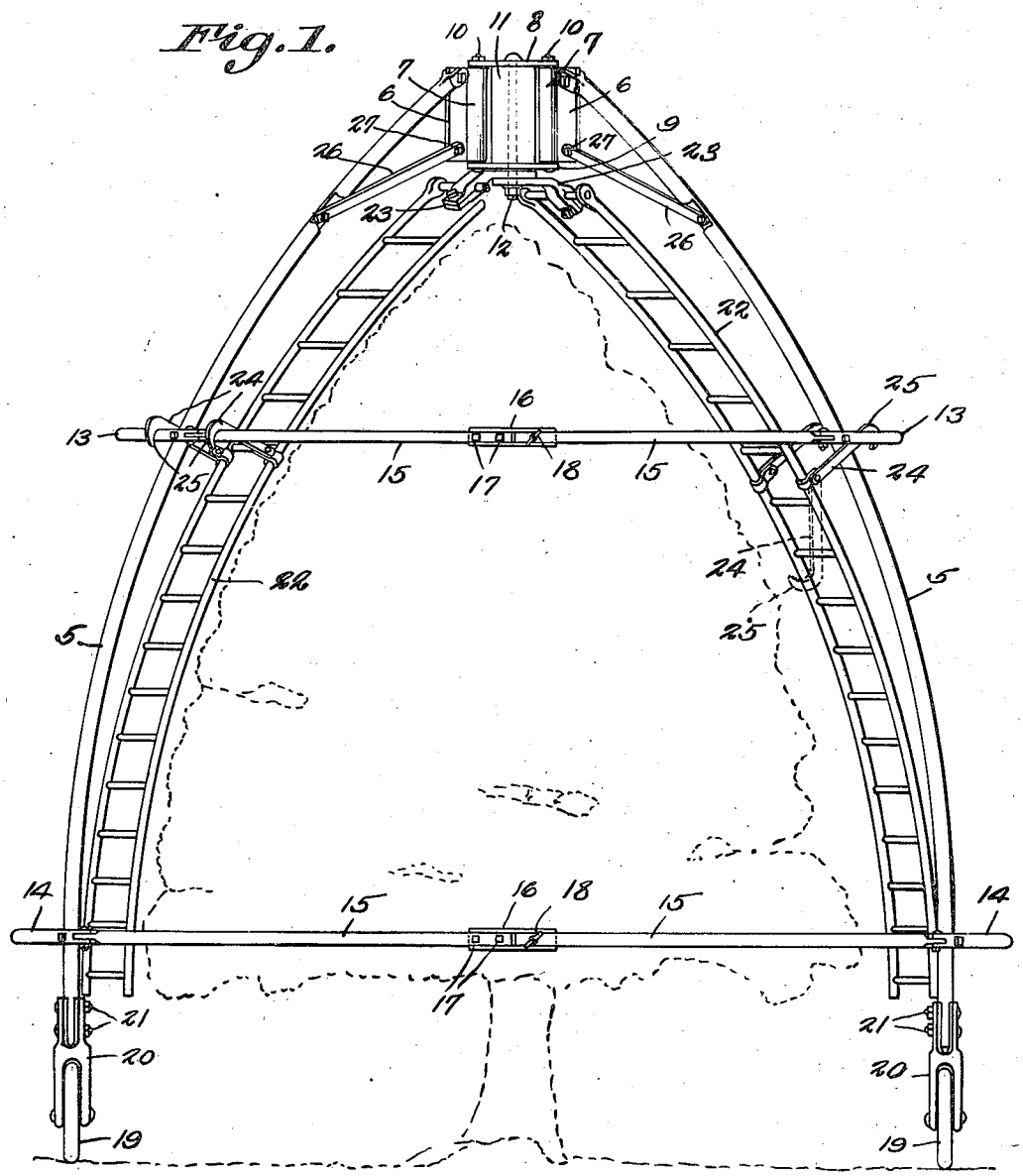
Figure 1 is an elevational view of a fruit picker's apparatus, constructed in accordance with the invention.

Referring to the drawings in detail, the frame comprises curved uprights 5 that have their upper ends connected to the flanges 6, forming a part of the members 7. These members 7 are tubular in formation and are supported between the plates 8 and 9, the members 7 being secured to the plates by means of the bolts 10 that extend through the members 7 and plates. The plates 8 and 9 are further held in spaced relation with respect to each other, by means of the tubular spacing member 11, through which the bolt 12 extends, the bolt 12 being of a length to extend an appreciable distance beyond the lower plate 9, as clearly shown by Fig. 1 of the drawings.

The curved uprights 5 are secured in spaced relation with respect to each other, by means of the rings 13 and 14, the ring 13 being disposed at a point slightly above the centers of the curved uprights 5, while the ring 14 is connected to the uprights 5, at points adjacent to the lower or free ends thereof. Each of these rings includes front and rear pivoted sections 15 which have their free ends connected by means of the plates 16 that are secured to the pivoted sections by means of the bolts 17 and winged nuts 18.

Due to this construction, it will be seen that these pivoted sections may be swung to their open positions as shown by dotted lines in Fig. 2 of the drawings, to permit the frame to be moved to a position to surround a tree.

At the lower ends of the uprights 5, are supporting wheels 19 that are mounted in the forks 20 which in turn are secured to the uprights 5 by means of the bolts 21.

The reference character 22 indicates ladders which are curved to conform to the general shape of the frame, the upper ends of the ladders being pivotally connected with the arms 23, that in turn are pivotally mounted on the bolt 12 so that the ladders may be swung in the arcs of circles to properly locate the ladders with respect to the limbs of the tree for the convenience of the pickers in picking the fruit.

Pivoted arms 24 are connected with the ladders, and have hooks 25 formed at their free ends, which hooks are adapted to hook over the upper ring 13 to support the ladders in their adjusted positions.

Brace arms 26 are pivotally connected with the curved uprights 5, and these arms 26 are pivotally connected with the flanges 6, by means of bolts 27.

From the foregoing it will be seen that due to the construction shown and described, picking frames such as described, may be positioned at the ends of rows of fruit-bearing trees, and the fruit pickers may adjust the ladders with respect to the limbs of the trees, so that the fruit may be readily removed therefrom. After a tree has been stripped, the frame may be moved to the next tree of the row where the ladders may again be adjusted and the fruit readily removed.

What is claimed is:

1. A device of the class described, comprising a frame shaped to conform to the shape of a tree, said frame adapted to be moved to a position to encircle a tree, ladders, and means for pivotally connecting the ladders to the frame for vertical and horizontal adjustment with respect to the frame.

2. A device of the character described, comprising a wheel-supported frame shaped to fit around a tree, said frame embodying curved uprights, means for pivotally connecting the curved uprights at their upper ends, ring members connecting the curved uprights, said ring members embodying front and rear pivoted sections adapted to swing to open positions whereby said frame may be moved to a position surrounding a tree, and ladders pivotally mounted within the frame for pivotal movement in vertical and horizontal planes.

3. A device of the character described, comprising a wheel-supported frame shaped to fit around a tree, said frame embodying curved uprights, means for pivotally connecting the curved uprights at their upper ends, ring members connecting the curved uprights at points between the ends of the uprights, curved ladders pivotally connected at the top of the frame, said ladders extending to points adjacent to the bottom of the frame, and hooks pivotally connected with the ladders adapted to hook over one of said ring members, whereby the ladders are supported in elevated positions.

JOHN O. SAVAGE.